March 7, 1950

M. BONNET 2,499,453

LENTICULAR PICTURE ELEMENT WITH REFLECTING BACK SUPPORT

Filed Dec. 7, 1945

Inventor
M. Bonnet

March 7, 1950

M. BONNET
LENTICULAR PICTURE ELEMENT WITH
REFLECTING BACK SUPPORT 2,499,453

Filed Dec. 7, 1945

Inventor
M. Bonnet
By Hauer Downey Lubell
Attys.

Patented Mar. 7, 1950

2,499,453

UNITED STATES PATENT OFFICE 2,499,453

LENTICULAR PICTURE ELEMENT WITH REFLECTING BACK SUPPORT

Maurice Bonnet, Paris, France, assignor to La Reliephographie, Société pour l'Exploitation des Procédés de Photographie en relief Maurice Bonnet, Paris, France, a French corporation Application December 7, 1945, Serial No. 633,516
In France October 6, 1943

Section 1, Public Law 690, August 8, 1946
Patent expires October 6, 1963

2 Claims. (Cl. 88—1)

In French Patent No. 852,964, dated October 24, 1938, I have, in particular, described and illustrated means intended to be used for obtaining peri-stereoscopic pictures or photographs, said means being intended to improve the reflection conditions, through the back of the photograph, of the light which strikes the latter. For that purpose, I have proposed to form in the rear face of the image projections or facets such as flutes of triangular cross section with equal or unequal sides, said flutes being so set as to be perpendicular to the main direction of admission of the light.

Now, my work and experiments have allowed of ascertaining that said means could advantageously apply not only to peri-stereoscopy, but also to simple, monochromatic or polychromatic photography, and in general to all photographic or photomechanical images observable by reflection.

The present invention has for object various embodiments and improvements for the utilization of the back coating forming the reflection intensifier, in accordance with the above-mentioned invention, said improvements concerning both the application to simple photographs and the application to peri-stereoscopic images.

The invention relates to the obtaining of reflecting facets as well as to the means for setting and utilising said coating, used as the reflection intensifying back support, according to the invention. Said means allow of giving in all the cases to the flutes of the reflection intensifying device, relatively to the image, the direction the most suited to the place chosen for placing or setting the photograph.

In order to render more evident the advantage obtained in extending the invention to simple photographs, I recall the following to mind:

When a photograph is looked at (whether it be a simple photograph or a peri-stereoscopic image), the luminous rays which strike said photograph pass through the gelatine layer which contains the image: they are reflected by the support of said image-layer (support usually constituted by a paper), and again pass through the gelatine to reach the observer's eyes. It will therefore be understood that the more the supporting back of the image-layer reflects, the more the photographic image appears brilliant, and the more the scale of its values is wide.

In the actual state of the art, it is for instance impossible, owing to the deficiency of the reflecting properties of the supports used for photographic image-layers, to correctly render the value of the brilliant portions of an object. For remedying this inconvenience, it has already been proposed to use, as photograph support, either metallized papers, or even metal sheets. Said reflecting supports indeed increase the values of the image, but only under certain settings relatively to the light which illuminates them. Moreover, the reflecting surface of the support being parallel to the free surface of the image-layer, troublesome reflections are caused on said free surface, at the very moment when the metal or metallized support acts the best as reflector. For these reasons, the reflecting backs proposed up to now for simple photographs do not satisfy the particular requirements for lighting said photographs, which generally occupy well defined places, and the setting of which is fixed relatively to the luminous sources.

I have specified, in the above-mentioned patent, that the reflections produced by the back of the photograph must be suitably different from total reflection, such as that produced by a mirror, and that, consequently, said back must remain a diffusing back.

The experiments I have since effected have led to the discovery that said diffusing action could, in certain cases, be ensured by the layer which carries or contains the image itself, this dispensing with the provision, on the back, of particular diffusing means. If the luminous source which lights the photograph is itself diffused (day-light for instance) the additional diffusion ensured by the image-layer is sufficient in practice. On the contrary, in the case of artificial lighting (bare electric lamp for instance) the reflecting support must be contrived itself to provide the necessary diffusion. The present invention therefore concerns, among others, particular means ensuring the diffusion, to the necessary degree, of the light reflected by the back support and particular methods for constituting said support, combined with said means.

The invention will be described in detail hereinafter, with reference to the accompanying drawings, drawn without considering scale or proportions, in order to facilitate the description.

In the following, for greater simplicity, the reflecting and diffusing back support, forming the reflection intensifier, obtained according to the invention, will be called the "back" of the photograph.

Figure 1:
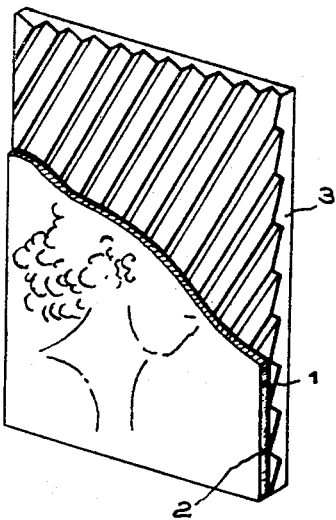
Fig. 1 shows in perspective a simple photograph, partly broken away, and which comprises a back coating obtained according to the principle protected by the above-mentioned patent.

The simple photograph illustrated in Fig. 1 comprises the image-layer 1 carried by the front transparent support 2, constituted for instance by a glass plate, but which can also be formed by a sheet or film of suitable transparent synthetic material. The back 3 of said photograph applied against the image-layer 1 is, according to the invention, constituted by a reflecting device, of the type of that described in the aforementioned patent. It has, as shown in the figure, a multitude of parallel flutes, of general triangular cross section, giving rise to narrow reflecting surfaces. The width of said surfaces is of the order of $\frac{1}{10}$ of a millimeter, so that they are invisible at the normal distance at which the image is observed. The choice of the width of the flutes can vary between certain limits, and depends, in the first place, on the size of the image.

As it has been specified in said prior patent, the parallel reflecting surfaces 3 are set in a direction variable according to the conditions of utilization, relatively to the edges of the image. They are set, in each case, so that the ridges thereof are perpendicular to the main direction of the luminous rays striking the photograph, so as to ensure the maximum reflection of said rays, and, consequently, to intensify, to the maximum, the luminosity of the image, the place occupied by the luminous source being taken into account.

Figure 2:
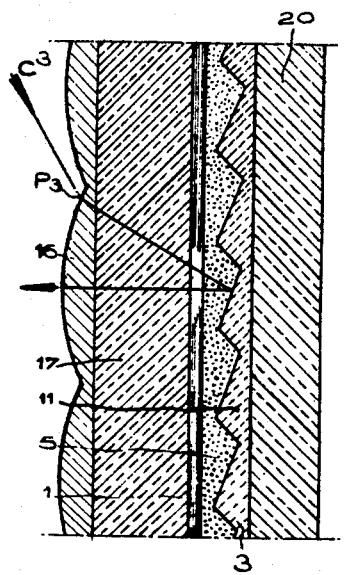
Fig. 2 illustrates on an enlarged scale, a horizontal section of a peri-stereoscopic image, equipped according to the invention.

Fig. 2 shows a peri-stereoscopic image comprising a fluted back 3 and an observation selected, or Selectoscope 16, similar to those forming the subject-matter of the afore-mentioned patent, the Selectoscope 16 being, in the known manner, obtained by moulding after securing the material composing it, on a transparent, rigid and plane support 17.

This reflecting-diffusing back 3 is essentially composed, in any case, by a fluted homogeneous or composite sheet, made of a material possessing naturally or owing to a suitable preparation, reflecting properties. Several modifications of this back 3 have been moreover described by me.

According to the invention, the Selectoscope 16, 17 constitutes an element separate from the image proper, capable of being applied and secured to the latter after the treatment of said image is finished, said image being then carried by the back 3.

For that purpose, the flutes are, according to the present invention, filled up for instance by transparent gelatine 5, slightly covering the apices of the flutes, to form an approximately plane surface, on which is poured, in the usual manner, the photo-sensitive emulsion 1, intended to receive the image. The latter therefore forms a unit with the reflecting back itself, whilst thus presenting the indispensable uniform thickness. If necessary, the back 3 can be secured to a support constituted for instance by a glass plate 20, ensuring thereto the necessary flatness and rigidity.

The back of the peri-stereoscopic image according to Fig. 2 is made of a suitable thermoplastic material, moulded in the hot state and under pressure, for instance a synthetic resin, loaded with metallic particles (aluminium or aluminium bronze, for instance) so as to have the required reflecting properties.

Figure 3:
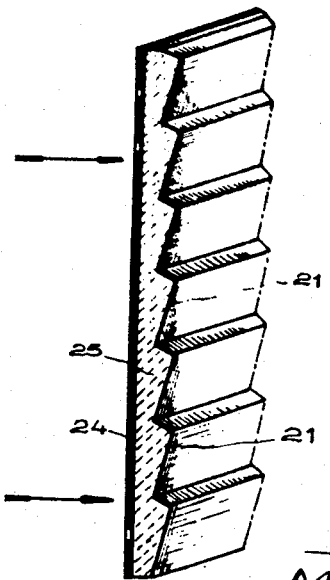
Fig. 3 illustrates a modification of a simple photograph having a back support forming a reflection intensifier.

Fig. 3 relates to a second modification and shows a simple photograph, consisting in an image-layer 24, poured on the plane face of the supporting back constituted for instance by a transparent thermoplastic material 25. The fluted rear surface of said back receives a coating 21 which forms a reflector at its inner face. If the material 25 has not the necessary flatness and rigidity, it can be reinforced by means of a layer of opaque material having the necessary mechanical properties, and secured against the rear face of the photograph.

In accordance with the invention, the material 5 for filling the flutes can contain particles in suspension ensuring the desired diffusion (titanium oxide, paryta sulphate, for instance) or also present a certain opalescence.

When the image-layer can be itself used alone for obtaining the desired diffusion effect, as mentioned in the foregoing its action is similar to that ensured by the filling material 5.

In the particular case where the back according to the invention is applied to peri-stereoscopic images, in which the lined images are covered by a selective grating having cylindrical lenticular elements (Selectoscope), it is necessary, when choosing the inclination to be given to the flutes, to also take into account the phenomenon of formation of "moires," capable of being caused between the flutes of the back, the image-lines of the photo-sensitive layer and the cylindrical lenticular elements of the Selectoscope. Any risk of the appearance of moires can be practically eliminated by setting the flutes according to an angle of 30° at least relatively to the direction of the image-lines and lenticular elements, that is to say relatively to the vertical. On the other hand, the more the width of the flutes differs from that of the lenticular elements, the slighter will be the risk of causing the appearance of moires.

It must be mentioned, concerning the particular application of the invention to peri-sterescopic images, that the phenomenon of concentrating a diffused light (window, chandelier, etc.) at the focus of each of the lenticular elements, of the Selectoscope, before said light is reflected by the facets of the flutes of the support according to the invention, amplifies to a surprising degree the reflection effect due to said support, which renders this application particularly attractive.

As specified in the above mentioned patent, the flutes must be set at right angles to the main direction according to which the light is admitted, for ensuring the maximum reflection towards the observer placed in front of the image. More exactly, the ridges thereof must be set in this manner.

I will now disclose a procedure for practically choosing, in each case, the direction to be given to the faces of the flutes, that is to say for choosing the cross section of said flutes, in view of obtaining the best possible output of the reflecting dorsal support.

Figure 4:
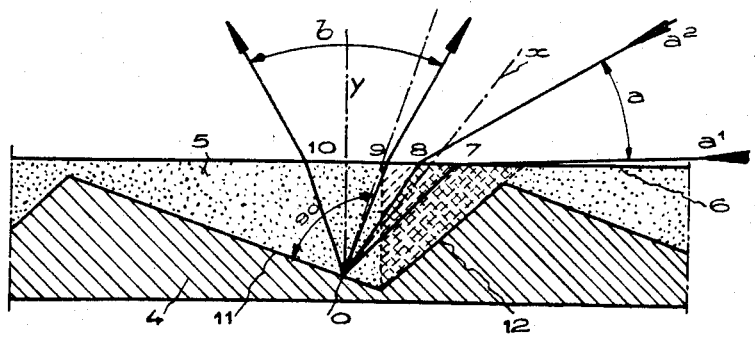
Fig. 4 illustrates a method which, according to the invention, allows of determining the most advantageous profile to be given to the flutes of the reflection-intensifying support, in respect of the conditions for lighting and of location of simple photographs or peri-stereoscopic images provided with said support.

Fig. 4 indicates the geometrical construction allowing said determination.

The material in which the flutes are formed is designated by 4. Said flutes are filled with a transparent material 5, the index of refraction of which is for instance equal to that of gelatine, which material can moreover be effectively constituted by gelatine, as contemplated in the embodiment according to Fig. 2.

The angle at which the rays issuing from the luminous source are capable of striking the surface 3 of the photograph is designated by $a$, and $b$ denotes the angle at which said same rays must be reflected towards the observer. The skimming ray $a^1$ strikes the surface 6 at point 7, and is refracted in the transparent material 5, to encounter the reflecting surface 11. The extreme incident ray $a^2$ itself strikes the surface 6 at point 8, and encounters the first ray at a point O, through which the reflecting surface must pass. It is assumed that the observer looks at the image at right angles to the plane of the latter, and it is therefore necessary that the beam $a$ should be reflected at $b$, so that the mean ray of the latter beam is, in its turn, at right angles to the plane 6 of the image. The points at which the beam $b$ emerges are designated by 9 and 10. The bisectors of both angles 7—O—8 and 9—O—10 are respectively designated by X and Y. According to the laws of reflection, the reflecting surface 11 must be perpendicular to the bisector of angle X—O—Y.

The inclination of the reflecting face 11 of the flute is thus determined: the other face 12 thereof must theoretically be perpendicular to the plane 6 of the image, since it plays no part whatever in the reflection, and that said perpendicular setting would render it completely invisible to the observer.

However, it would then prevent the passage of the incident rays $a$, as illustrated by the triangle hatched with dots. The optimum inclination is in fact that according to which said face is parallel to the skimming ray refracted into the transparent material 5, that is to say the ray 7—O.

Figure 5:
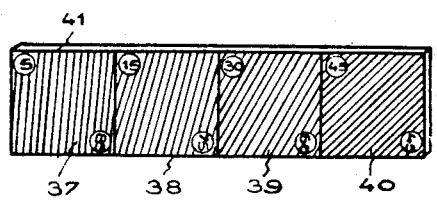
Fig. 5 illustrates a graduated board allowing the determination on the spot of the features of the reflection intensifier to be chosen in each case.

The drawings also illustrate a device allowing one to experimentally determine, beforehand, the best inclination to be given to the flutes of the reflecting back, before the printing of the image on the latter. Said device illustrated in Fig. 5 is composed of a certain number of panels 37, 38, 39, 40, juxtaposed and secured to a common board: each panel is constituted by a portion of reflecting back, and the inclination of the flutes progressively differs from one to the other of said panels. The board 41 being placed at the future location of the photograph, it allows of immediately ascertaining which is the panel the reflection of which is the most brilliant, and therefore that panel the flutes of which will have the most favourable obliquity for a photograph placed in the same location. Each panel carries a reference mark indicating the inclination of said flutes. It is to be noted that the board illustrated in Fig. 5 can be used indifferently in a horizontal or a vertical position, and thus supplies, with four panels only, seven different inclinations for the flutes.

In the foregoing, only triangular flutes having plane surfaces and sharp angles have been contemplated. However, this preferred form must not be considered in a limiting sense. It is thus seen that the reflecting surfaces 11 proper can be given for, instance, a slightly curved shape, either convex or concave, this causing a certain effect of dispersion of the reflected rays. For manufacturing reasons the ridges of the flutes might be slightly rounded.

It is to be understood that the invention is applicable to all kinds of photographs, and among others to polychromatic photographs. The utilisation of the back reflection intensifying support according to the invention will also ensure an appreciable improvement in colour photographs having multiple layers, owing to the brilliancy which it is thus possible to give to their colours.

Having now particularly described and ascertained the nature of my said invention and in what manner the same is to be performed, I declare that what I claim is:

1. A lenticular photograph picture comprising a reflection intensifying support layer provided with parallel flutes of substantially triangular cross section, a layer of light-transmitting material covering said flutes and providing a substantially plane outer surface, a photograph image layer adhered directly to the plane outer surface of said material, and a lenticular screen covering said image layer.

2. A lenticular photograph picture comprising a reflection intensifying support layer provided with parallel flutes of substantially triangular cross section, a layer of light-transmitting light-diffusing material covering said flutes and providing a substantially plane outer surface, a photograph image layer adhered directly to the plane outer surface of said material, and a lenticular screen covering said image layer.

MAURICE BONNET.

REFERENCES CITED

The following references are of record in the file of this patent:

UNITED STATES PATENTS

| Number | Name | Date |
| --- | --- | --- |
| 1,425,142 | Sapp | Aug. 8, 1922 |
| 1,858,975 | Bois | May 17, 1932 |
| 2,149,171 | Grote | Feb. 28, 1939 |
| 2,379,702 | Gebhard | July 3, 1945 |

FOREIGN PATENTS

| Number | Country | Date |
| --- | --- | --- |
| 356,501 | Great Britain | Sept. 10, 1931 |
| 410,517 | Great Britain | May 18, 1934 |
| 852,964 | France | Nov. 18, 1939 |